(12) United States Patent
Hardi

(10) Patent No.: US 11,924,364 B2
(45) Date of Patent: Mar. 5, 2024

(54) INTERACTIVE NETWORKED APPARATUS

(71) Applicant: Muzik Inc., Palo Alto, CA (US)

(72) Inventor: Jason Hardi, Beverly Hills, CA (US)

(73) Assignee: Muzik Inc., Palo Alto, CA (US)

( * ) Notice: Subject to any disclaimer, the term of this patent is extended or adjusted under 35 U.S.C. 154(b) by 0 days.

(21) Appl. No.: 17/650,546

(22) Filed: Feb. 10, 2022

(65) Prior Publication Data

US 2022/0337692 A1    Oct. 20, 2022

Related U.S. Application Data

(63) Continuation of application No. 16/783,331, filed on Feb. 6, 2020, now abandoned, which is a continuation
(Continued)

(51) Int. Cl.
*H04M 1/60* (2006.01)
*B62D 1/04* (2006.01)
(Continued)

(52) U.S. Cl.
CPC ............ *H04M 1/6066* (2013.01); *B62D 1/04* (2013.01); *G06F 1/169* (2013.01); *G06F 1/1694* (2013.01); *G06F 3/016* (2013.01); *G06F 3/017* (2013.01); *G06F 3/033* (2013.01); *G06F 3/041* (2013.01); *G06F 3/04883* (2013.01); *G06F 3/165* (2013.01); *G11B 27/105* (2013.01); *G11B 27/34* (2013.01); *H04B 1/385* (2013.01); *H04L 65/611* (2022.05); *H04L 65/75* (2022.05);
(Continued)

(58) Field of Classification Search
CPC ......... H04L 65/75; H04L 65/611; B62D 1/04; H04W 4/80; H04M 1/6066; G06F 1/169
See application file for complete search history.

(56) References Cited

U.S. PATENT DOCUMENTS

| | | | |
|---|---|---|---|
| 5,815,126 A | 9/1998 | Fan et al. | |
| 5,872,924 A | 2/1999 | Nakayama et al. | |

(Continued)

FOREIGN PATENT DOCUMENTS

| | | | |
|---|---|---|---|
| KR | 10-2008-0004229 A | 1/2008 | |
| KR | 10-2011-0107477 A | 10/2011 | |

OTHER PUBLICATIONS

Notification of Transmittal of the International Search Report and the Written Opinion of the International Searching Authority, or the Declaration, PCT/US2017/056986, dated Feb. 6, 2018, 13 pages.

(Continued)

*Primary Examiner* — Andrea C Leggett
(74) *Attorney, Agent, or Firm* — Duane Morris LLP

(57) ABSTRACT

Methods, systems, and apparatus, including computer programs encoded on a computer storage medium, for connecting an interactive wearable device with a network. In one aspect, a method includes loading content from a playlist; recognizing contextual information relating to the content; determining the location of the user; requesting supplemental content via a network based on the contextual information and the location; displaying supplemental information to a user; interacting with the supplemental information at least in part via an interactive apparatus.

10 Claims, 11 Drawing Sheets

Related U.S. Application Data of application No. 15/992,421, filed on May 30, 2018, now Pat. No. 10,567,564, which is a continuation of application No. 15/162,152, filed on May 23, 2016, now Pat. No. 9,992,316, which is a continuation of application No. 13/802,217, filed on Mar. 13, 2013, now abandoned.

(60) Provisional application No. 61/762,605, filed on Feb. 8, 2013, provisional application No. 61/749,710, filed on Jan. 7, 2013, provisional application No. 61/660,662, filed on Jun. 15, 2012.

(51) Int. Cl.

| | | |
|---|---|---|
| G06F 1/16 | (2006.01) | |
| G06F 3/01 | (2006.01) | |
| G06F 3/033 | (2013.01) | |
| G06F 3/041 | (2006.01) | |
| G06F 3/04883 | (2022.01) | |
| G06F 3/16 | (2006.01) | |
| G11B 27/10 | (2006.01) | |
| G11B 27/34 | (2006.01) | |
| H04B 1/3827 | (2015.01) | |
| H04L 65/611 | (2022.01) | |
| H04L 65/75 | (2022.01) | |
| H04R 1/10 | (2006.01) | |
| H04W 4/02 | (2018.01) | |
| H04W 4/80 | (2018.01) | |

(52) U.S. Cl.
CPC .......... *H04R 1/1041* (2013.01); *H04W 4/025* (2013.01); *H04W 4/80* (2018.02)

(56) References Cited

U.S. PATENT DOCUMENTS

| | | |
|---|---|---|
| 5,880,743 A | 3/1999 | Moran et al. |
| 6,010,216 A | 1/2000 | Jesiek |
| 6,057,845 A | 5/2000 | Dupouy |
| 6,061,064 A | 5/2000 | Reichlen |
| 6,476,834 B1 | 11/2002 | Doval et al. |
| 6,956,562 B1 | 10/2005 | O'Hara et al. |
| 7,004,394 B2 | 2/2006 | Kim |
| 7,030,861 B1 | 4/2006 | Westerman et al. |
| 7,065,185 B1 | 6/2006 | Koch ................ H04M 3/42382 |
| | | 379/88.14 |
| 7,312,699 B2 | 12/2007 | Chomenky |
| 7,479,949 B2 | 1/2009 | Jobs et al. |
| 7,631,811 B1 | 12/2009 | Brown |
| 7,925,029 B2 | 4/2011 | Hollemans et al. |
| 8,169,414 B2 | 5/2012 | Lim |
| 8,184,983 B1 | 5/2012 | Ho et al. |
| 8,203,502 B1 | 6/2012 | Chi et al. |
| 8,217,856 B1 | 7/2012 | Petrou |
| 8,223,088 B1 | 7/2012 | Gomez et al. |
| 8,448,083 B1 | 5/2013 | Migos et al. |
| 8,571,544 B2 | 10/2013 | Pelland et al. |
| 8,643,951 B1 | 2/2014 | Wheeler et al. |
| 8,655,420 B1 | 2/2014 | Pelland et al. |
| 8,677,285 B2 | 3/2014 | Tsern et al. |
| 8,711,656 B1 | 4/2014 | Paulson |
| 8,743,021 B1 | 6/2014 | Park et al. |
| 8,819,697 B2 | 8/2014 | Bakaleinik et al. |
| 8,873,147 B1 | 10/2014 | Rhodes et al. |
| 8,941,560 B2 | 1/2015 | Wong et al. |
| 9,035,878 B1 | 5/2015 | Wheeler |
| 9,036,028 B2 | 5/2015 | Buehler |
| 9,046,999 B1 | 6/2015 | Teller |
| 9,064,436 B1 | 6/2015 | Patel |
| 9,075,249 B2 | 7/2015 | Heinrich et al. |
| 9,158,975 B2 | 10/2015 | Lipton et al. |
| 9,164,588 B1 | 10/2015 | Johnson et al. |
| 9,292,082 B1 | 3/2016 | Patel et al. |
| 9,294,607 B2 | 3/2016 | Jacobsen et al. |
| 9,301,085 B2 | 3/2016 | Parkinson et al. |
| 9,442,631 B1 | 9/2016 | Patel et al. |
| 9,477,888 B1 | 10/2016 | Lewis |
| 9,500,867 B2 | 11/2016 | Hennelly et al. |
| 9,588,593 B2 | 3/2017 | Li |
| 9,658,451 B2 | 5/2017 | Kobayashi |
| 9,740,977 B1 | 8/2017 | Moon et al. |
| 9,818,126 B1 | 11/2017 | Faith et al. |
| 9,823,742 B2 | 11/2017 | Parker et al. |
| 9,904,369 B2 | 2/2018 | Lai et al. |
| 9,916,006 B2 | 3/2018 | Maltz |
| 10,007,849 B2 | 6/2018 | Bataller et al. |
| 10,055,853 B1 | 8/2018 | Fisher et al. |
| 10,078,787 B2 | 9/2018 | Carey |
| 2003/0014615 A1 | 1/2003 | Lynggaard |
| 2003/0115059 A1 | 6/2003 | Jayaratne |
| 2004/0145574 A1 | 7/2004 | Xin et al. |
| 2005/0022130 A1 | 1/2005 | Fabritius |
| 2005/0047629 A1 | 3/2005 | Farrell et al. |
| 2005/0212751 A1 | 9/2005 | Marvit et al. |
| 2005/0216867 A1 | 9/2005 | Marvit et al. |
| 2006/0072764 A1 | 4/2006 | Mertens et al. |
| 2006/0132382 A1 | 6/2006 | Jannard |
| 2007/0003098 A1 | 1/2007 | Martenson et al. |
| 2007/0052672 A1 | 3/2007 | Ritter et al. |
| 2007/0098263 A1 | 5/2007 | Furukawa et al. |
| 2007/0130547 A1 | 6/2007 | Boillot |
| 2007/0177803 A1 | 8/2007 | Ellas et al. |
| 2007/0211023 A1 | 9/2007 | Boillot |
| 2007/0223430 A1 | 9/2007 | Desai et al. |
| 2008/0048878 A1 | 2/2008 | Boillot |
| 2008/0111710 A1 | 5/2008 | Boillot |
| 2008/0120576 A1 | 5/2008 | Kariathungal et al. |
| 2008/0168403 A1 | 7/2008 | Westerman et al. |
| 2008/0235621 A1 | 9/2008 | Boillot |
| 2008/0268771 A1 | 10/2008 | Masuda |
| 2008/0287063 A1 | 11/2008 | Kidron et al. |
| 2009/0015433 A1 | 1/2009 | James et al. |
| 2009/0022117 A1 | 1/2009 | Quigley et al. |
| 2009/0097689 A1 | 4/2009 | Prest et al. |
| 2009/0099836 A1 | 4/2009 | Jacobsen |
| 2009/0128448 A1* | 5/2009 | Riechel ................ G06F 3/0346 |
| | | 345/8 |
| 2009/0154739 A1* | 6/2009 | Zellner ................ H04R 3/00 |
| | | 381/311 |
| 2009/0204410 A1 | 8/2009 | Mozer et al. |
| 2009/0265670 A1 | 10/2009 | Kim et al. |
| 2009/0274317 A1* | 11/2009 | Kahn ................ H04M 1/6066 |
| | | 381/74 |
| 2009/0283341 A1 | 11/2009 | Lin |
| 2009/0305632 A1 | 12/2009 | Sarkissian et al. |
| 2010/0020998 A1 | 1/2010 | Brown et al. |
| 2010/0045928 A1* | 2/2010 | Levy ................ G02C 11/10 |
| | | 351/158 |
| 2010/0079356 A1* | 4/2010 | Hoellwarth ............ G09G 3/001 |
| | | 345/8 |
| 2010/0167821 A1 | 7/2010 | Tamura |
| 2010/0169075 A1* | 7/2010 | Raffa ................ G10L 13/00 |
| | | 704/260 |
| 2010/0169097 A1 | 7/2010 | Nachman et al. |
| 2010/0245585 A1* | 9/2010 | Fisher ................ H04M 1/725 |
| | | 348/240.99 |
| 2010/0293462 A1 | 11/2010 | Bull et al. |
| 2010/0328204 A1 | 12/2010 | Edwards |
| 2011/0001699 A1 | 1/2011 | Jacobsen et al. |
| 2011/0032071 A1* | 2/2011 | Tondering .............. H04B 1/202 |
| | | 340/4.31 |
| 2011/0041102 A1 | 2/2011 | Kim |
| 2011/0081859 A1* | 4/2011 | Chung ................ H04M 1/6066 |
| | | 455/569.1 |
| 2011/0102464 A1 | 5/2011 | Godavari |
| 2011/0187640 A1* | 8/2011 | Jacobsen ................ G06F 3/038 |
| | | 345/156 |
| 2011/0213664 A1 | 9/2011 | Osterhout et al. |
| 2011/0227871 A1 | 9/2011 | Cannon |
| 2011/0136797 A1 | 12/2011 | Johansson |

(56) References Cited

U.S. PATENT DOCUMENTS

| | | |
|---|---|---|
| 2011/0310120 A1 | 12/2011 | Narayanan |
| 2012/0009876 A1 | 1/2012 | Everaere |
| 2012/0065815 A1 | 3/2012 | Hess |
| 2012/0068914 A1 | 3/2012 | Jacobsen |
| 2012/0069243 A1* | 3/2012 | Beemster ......... H04N 21/25891 348/521 |
| 2012/0089390 A1 | 4/2012 | Yang .................... G10H 1/366 704/207 |
| 2012/0102124 A1 | 4/2012 | Hansson et al. |
| 2012/0102399 A1* | 4/2012 | Nicholson ............. G06F 3/0482 715/810 |
| 2012/0105473 A1 | 5/2012 | Bar-Zeev et al. |
| 2012/0105740 A1 | 5/2012 | Jannard et al. |
| 2012/0114132 A1 | 5/2012 | Abrahamsson et al. |
| 2012/0188345 A1* | 7/2012 | Salow ............. H04N 21/43637 348/47 |
| 2012/0194552 A1* | 8/2012 | Osterhout ............... G06F 1/163 345/633 |
| 2012/0216152 A1 | 8/2012 | Li |
| 2012/0236025 A1 | 9/2012 | Jacobsen |
| 2012/0249741 A1 | 10/2012 | Maciocci et al. |
| 2012/0274662 A1 | 11/2012 | Kim et al. |
| 2012/0306919 A1 | 12/2012 | Suzuki et al. |
| 2012/0314899 A1 | 12/2012 | Cohen et al. |
| 2013/0002545 A1 | 1/2013 | Heinrich et al. |
| 2013/0007672 A1 | 1/2013 | Taubman |
| 2013/0021269 A1 | 1/2013 | Johnson et al. |
| 2013/0044130 A1 | 2/2013 | Geisner et al. |
| 2013/0055103 A1 | 2/2013 | Choi et al. |
| 2013/0064386 A1 | 3/2013 | Yerrace et al. |
| 2013/0069985 A1 | 3/2013 | Wong et al. |
| 2013/0135353 A1 | 5/2013 | Wheeler et al. |
| 2013/0169514 A1 | 7/2013 | Edwards et al. |
| 2013/0231937 A1 | 9/2013 | Woodall et al. |
| 2013/0239000 A1 | 9/2013 | Parkinson et al. |
| 2013/0241805 A1 | 9/2013 | Gomez |
| 2013/0246967 A1 | 9/2013 | Wheeler et al. |
| 2013/0278631 A1 | 10/2013 | Border et al. |
| 2013/0321255 A1 | 12/2013 | Lamb et al. |
| 2013/0322648 A1 | 12/2013 | Chukka et al. |
| 2013/0326208 A1 | 12/2013 | Jabobsen et al. |
| 2014/0000015 A1 | 1/2014 | Arai |
| 2014/0002357 A1 | 1/2014 | Pombo et al. |
| 2014/0043214 A1 | 2/2014 | Park et al. |
| 2014/0111427 A1 | 4/2014 | Lindley et al. |
| 2014/0191964 A1 | 7/2014 | McDonald et al. |
| 2014/0253605 A1 | 9/2014 | Border et al. |
| 2014/0267419 A1 | 9/2014 | Ballard et al. |
| 2014/0365273 A1 | 12/2014 | Hurewitz |
| 2014/0380230 A1 | 12/2014 | Venable et al. |
| 2015/0009132 A1 | 1/2015 | Kuriya et al. |
| 2015/0054734 A1 | 2/2015 | Raghoebardajal et al. |
| 2015/0142440 A1 | 5/2015 | Parkinson et al. |
| 2015/0143287 A1 | 5/2015 | Khanahmadi |
| 2015/0153571 A1 | 6/2015 | Ballard et al. |
| 2015/0170418 A1 | 6/2015 | Flynn et al. |
| 2015/0206321 A1 | 7/2015 | Scavezze et al. |
| 2015/0220142 A1 | 8/2015 | Parkinson et al. |
| 2015/0288666 A1 | 10/2015 | Rao et al. |
| 2015/0309316 A1 | 10/2015 | Osterhout et al. |
| 2016/0004306 A1 | 1/2016 | Maltz |
| 2016/0026253 A1 | 1/2016 | Bradski et al. |
| 2016/0077337 A1 | 3/2016 | Raffle et al. |
| 2016/0103511 A1 | 4/2016 | Hardi et al. |
| 2016/0162020 A1 | 6/2016 | Lehman et al. |
| 2016/0178912 A1 | 6/2016 | Kusuda et al. |
| 2016/0329634 A1 | 11/2016 | Osterhout et al. |
| 2016/0370855 A1 | 12/2016 | Lanier et al. |
| 2017/0003750 A1* | 1/2017 | Li ........................... G06F 3/013 |
| 2017/0060230 A1 | 3/2017 | Faaborg et al. |
| 2017/0092002 A1 | 3/2017 | Mullins et al. |
| 2018/0018508 A1 | 1/2018 | Tusch |
| 2018/0143976 A1* | 5/2018 | Huston ................. G06T 19/006 |
| 2018/0181370 A1 | 6/2018 | Parkinson |
| 2018/0197218 A1 | 7/2018 | Mallesan et al. |
| 2018/0321493 A1 | 11/2018 | Kim et al. |
| 2018/0356884 A1 | 12/2018 | Lee et al. |

OTHER PUBLICATIONS

International Preliminary Report on Patentability; PCT/US2017/056986; dated Apr. 23, 2019; 9 pages.

International Preliminary Report on Patentability, PCT/US2013/045900, dated Dec. 16, 2014, 7 pages.

International Preliminary Report on Patentability, PCT/US2013/045851, dated Dec. 16, 2014, 9 pages.

International Search Report and Written Opinion, PCT/US2013/045851, dated Oct. 18, 2013, 14 pages.

International Search Report and Written Opinion, PCT/US2013/045900, dated Oct. 1, 2013, 14 pages.

* cited by examiner

INTERACTIVE NETWORKED APPARATUS

CROSS REFERENCE TO RELATED APPLICATIONS

This application is a continuation of U.S. patent application Ser. No. 16/783,331; filed Feb. 6, 2020 which is a continuation of U.S. patent application Ser. No. 15/992,421; filed May 30, 2018 (Now U.S. Pat. No. 10,567,564) which is a continuation of U.S. patent application Ser. No. 15/162,152, filed May 23, 2016 (Now U.S. Pat. No. 9,992,316), which is a continuation of U.S. patent application Ser. No. 13/802,217, filed Mar. 13, 2013, which claims the benefit of U.S. Provisional Patent Application No. 61/660,662, filed Jun. 15, 2012; U.S. Provisional Patent Application No. 61/749,710, filed Jan. 7, 2013; and U.S. Provisional Patent Application No. 61/762,605, filed Feb. 8, 2013 all of which are hereby incorporated herein by reference in their entireties.

BACKGROUND

This specification relates to networked wearable devices and more specifically to networked headphones. Headphones are widely used for a user to listen to audio content from an audio source, i.e., a portable media player or radio. A headphone includes a pair of circular earpads that encompass or rest on human ears, or a pair of earbuds that are inserted into the outer ears. A user can connect a headphone to an audio source by inserting one end of the headphone connection plug into a connection port on an audio source, and can hear audio content played at the source form the earpads or earbuds. Alternatively, headphones can be wirelessly connected to an audio source via an infrared or radio frequency connection, and receive a wireless signal such that audio content played at the audio source can be heard by the user at the headphones.

Current headphones do not provide a means for controlling audio or visual content at the audio source. Nor do current headphones allow for connectivity to a network for interaction with interactive content, the internet or other network, a social network, or other users.

BRIEF DESCRIPTION OF THE DRAWINGS

Like reference numbers and designations in the various drawings indicate like elements.

DETAILED DESCRIPTION

Figure 1:
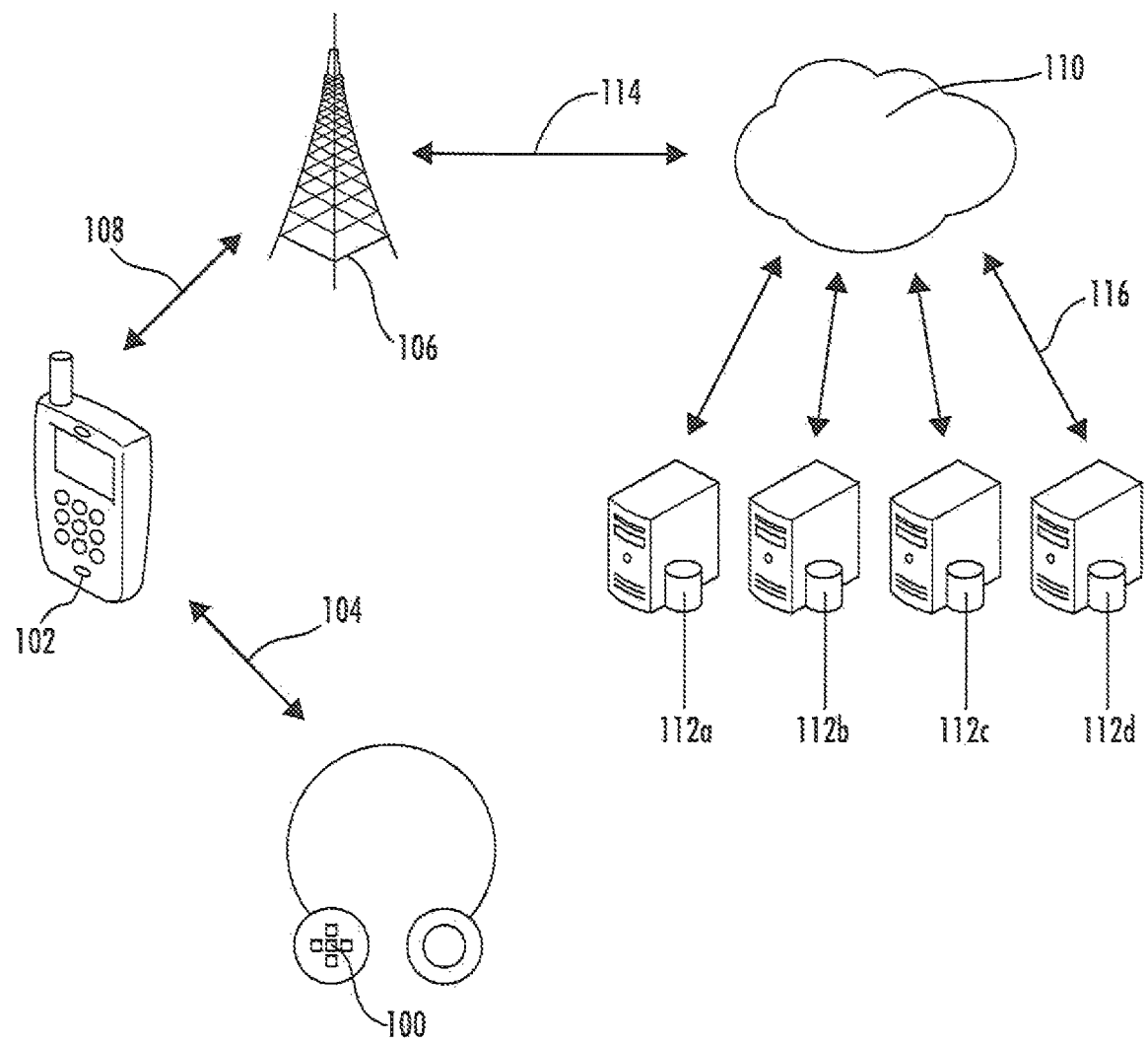
FIG. 1 is an example network of the present invention comprising interactive, networked headphones.

Broadly, an embodiment of the invention includes a headphone apparatus and a media player device that are used in conjunction to provide a user with audio playback of media content, and to allow the user to interact with social media sites, email providers, supplementary content providers, and ad providers based on the media content being played. FIG. 1 illustrates an exemplary embodiment of the apparatus. The headphones 100 are operably connected to the media player 102 through a hardwire connection or through a wireless connection 104, such as Bluetooth or Wi-Fi. The media player communicates with a network gateway 106 through wireless network connection 108, such as through a cellular connection or Wi-Fi connection. The network gateway provides network connectivity 114 to the Internet 110, facilitating access 116 to various content and service providers 112 connected to the Internet. Content and service providers may include email servers 112a, social media sites 112b, ad servers 112c, and content servers 112d.

Other implementations are contemplated. For example, the media player 102 may be one of many types of mobile devices, such as a cellular telephone, a tablet, a computer, a pager, a gaming device, or a media player. In other implementations, the wireless network connection 108 may be one of many types of communications networks through which data can be transferred, such as a Wi-Fi network, a cellular telephone network, a satellite communications network, a Bluetooth network, or an infrared network. In other implementations, the content and service providers 112 may also include search engines, digital content merchant sites, instant messaging providers, SMS message providers, VOIP providers, fax providers, content review sites, and online user forums.

Figure 2A:
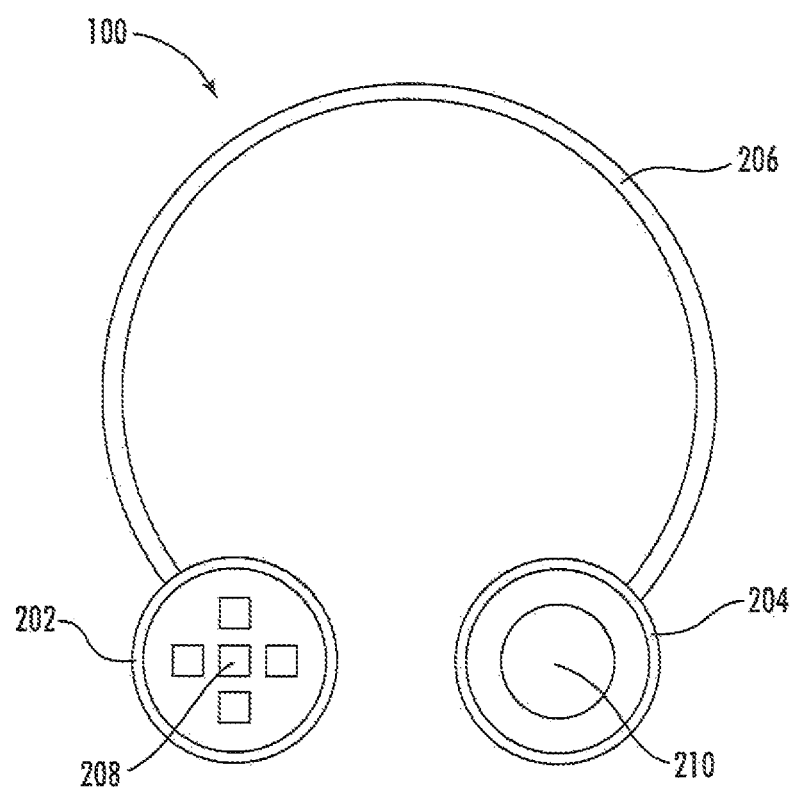
FIG. 2A is an example of an interactive, networked headphone of the present invention.

FIG. 2a illustrates an example embodiment of the headphones 100. The headphones 100 include a first earpiece assembly 202, a second earpiece assembly 204, and a headband assembly 206 that securely positions the earpieces 202 and 204 over the ears of a user. Each earpiece assembly 202 and 204 includes one or more externally accessible touch sensor arrays 208 and 210 for user interaction.

Figure 2B:
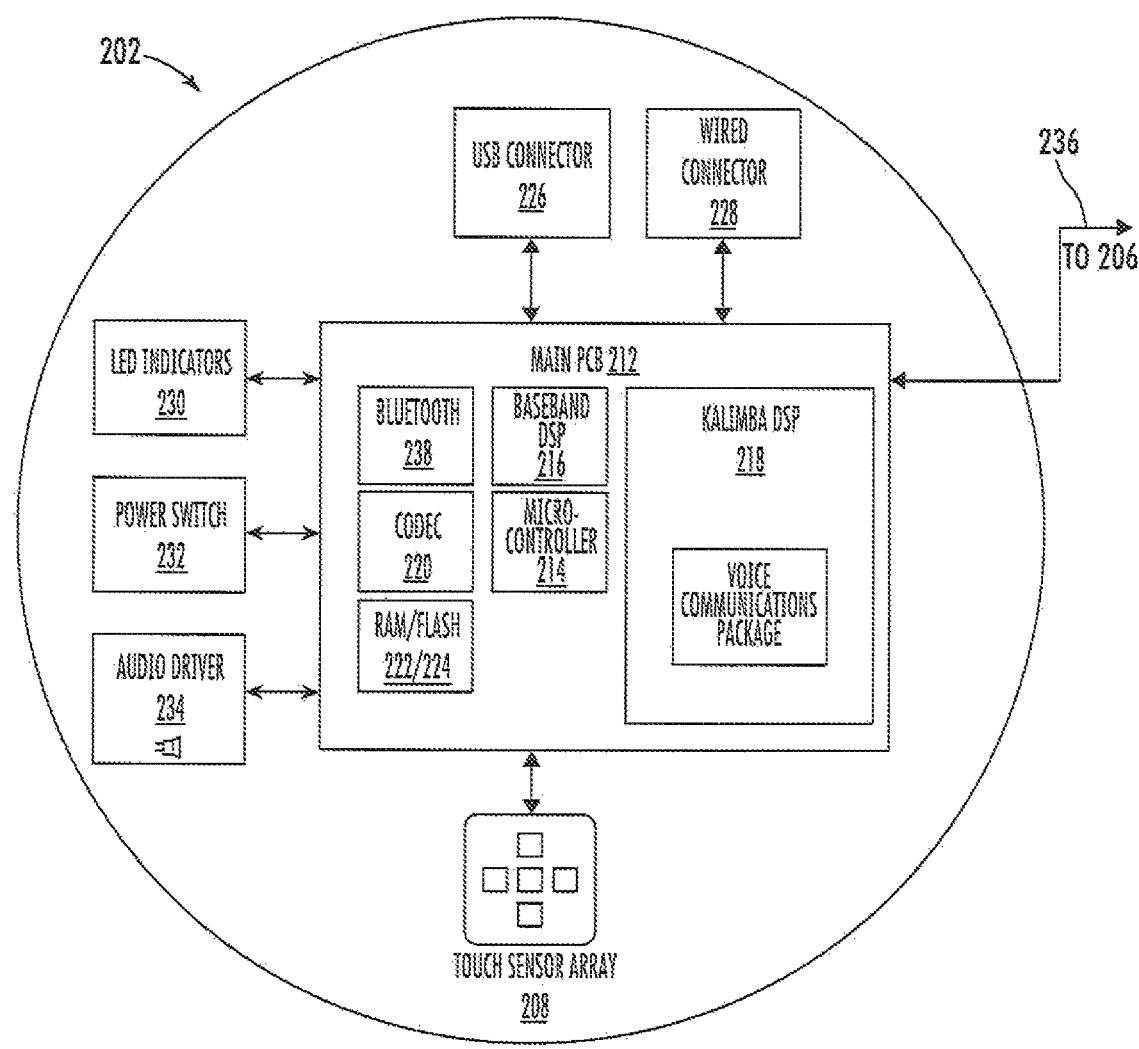
FIG. 2B is an example of an implementation of the present invention.

FIG. 2b illustrates the components of the first earpiece assembly 202. Mounted on the Main PCB 212 are a microcontroller 214, a Bluetooth transmitter and receiver 238, a baseband digital signal processor (DSP) 216, a Kalimba DSP 218, an audio/video codec 220, random access memory (RAM) 222, and non-volatile "flash" memory 224. Operably connected to the Main PCB 212 are a USB connector 226, a wired connector 228, light emitting diode (LED) indicators 230, a power switch 232, an audio driver 234, and touch sensor array 208. The first earpiece assembly 202 is connected to the second earpiece assembly 204 through a wired connection 236 passing through the headband assembly 206.

Figure 2C:
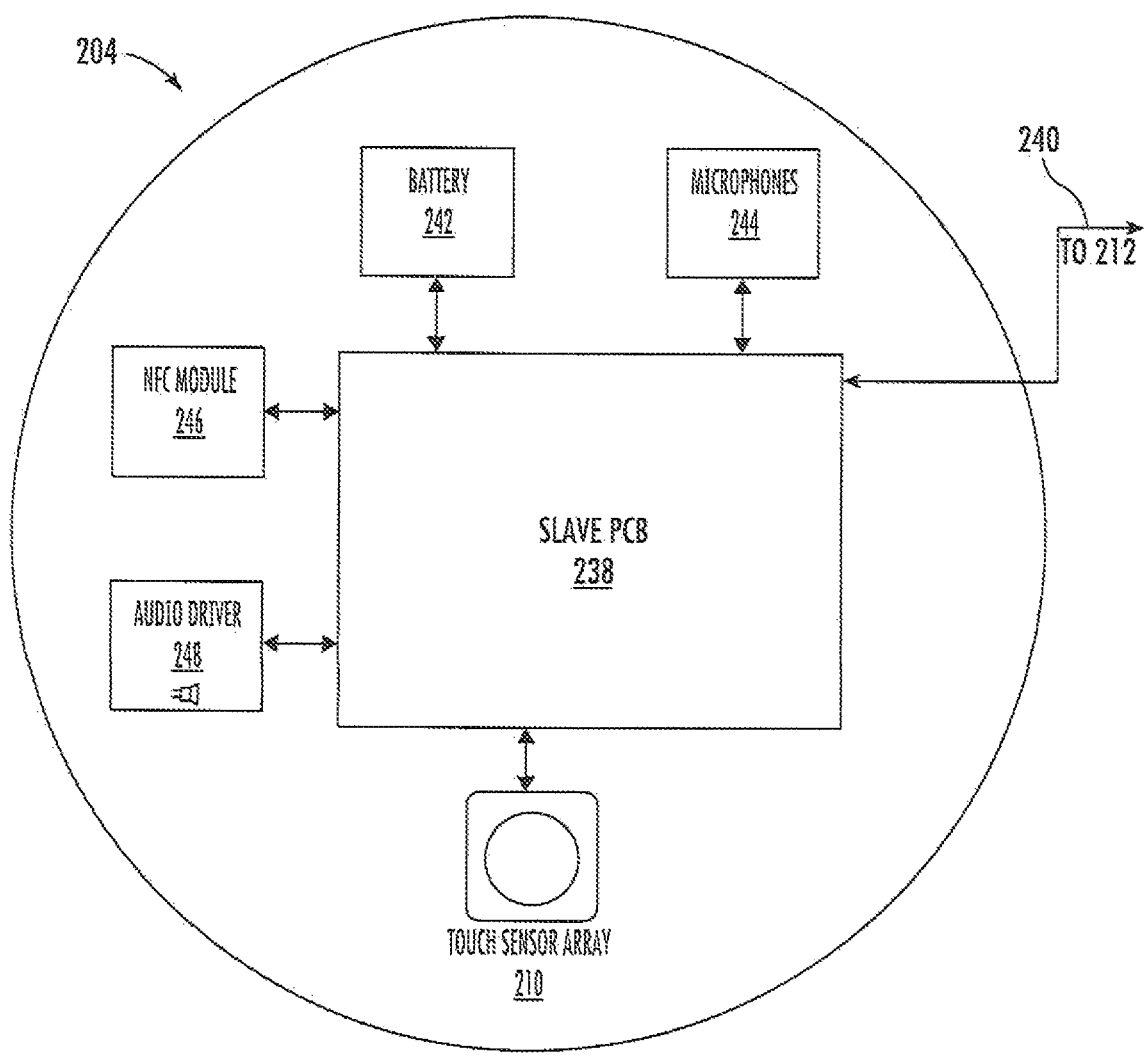
FIG. 2C is an example of an implementation of the present invention.

FIG. 2c illustrates the components of the second earpiece assembly 204. The Slave PCB 238 is connected to the Main PCB 212 of the first earpiece assembly 202 through a hardwire connection 240. Operably connected to the Slave PCB 238 are a battery 242, microphone array 244, near-field communication (NFC) module 246, an audio driver 248, and a touch sensor array 210.

The Main PCB 212 and Slave PCB 238 provide connectivity between the various components of the earpiece assemblies. The microprocessor 214 accepts inputs from the touch sensor array 208 and 210, USB connector 226, and wired connector 228, and if necessary, translates the inputs into machine compatible commands. Commands and other data are transmitted between the microprocessor 214 and/or the connected components. For example, audio from the microphone 244 and the wired connector 228 is digitally encoded by the codec 220 and processed by the baseband DSP 216 and Kalimba DSP 218, where it may be modified and mixed with other audio information. Mixed audio is decoded by the codec 220 into an analog representation and is output to the audio drivers 234 and 248 for playback. LEDs 230 are operably connected to the microcontroller 214 and may be illuminated or flashed to indicate the operational status of the headphone apparatus 100. Power is supplied by the battery 242 operably connected to the microcontroller 214, and power may be toggled by using a power switch 232. Additional components, such as wireless transceivers, may be operably connected to and controlled by the microprocessor. The microprocessor 214 may transmit data to an externally connected computing device, such as a smart phone or media player, via the wireless transceivers 238, the USB connector 226, or the wired connector 228. The data may include data used to identify the specific model, features, and unique identifying information of the headphones.

Other implementations are contemplated. For example, one or more of the touch sensor arrays 208 or 210 may instead be physical buttons, switches, or dials. Additional connectors may be provided on the first or second earpiece assemblies, including an audio output port, an optical port, Firewire port, an Ethernet port, a SATA port, a power input port, a Lightning port, or a serial port. Power, digital data, or analog data may be input into the apparatus or output from the apparatus using these ports. In some implementations, the headphone apparatus 100 may also include a video display unit, such that visual content may be displayed on the device. The video display unit may be a LCD display, or may be a heads-up display (HUD) that overlays visual data over a transparent or translucent viewing element. In some embodiments, one or more of the components stored in each of the earpiece assemblies 202 and 204 may be relocated to the other earpiece assembly or to an external housing unit. The housing unit may be positioned on the headband 206, on one of the wired connections, or elsewhere on the headphone apparatus. In some implementations, the headphone may have a GPS device that can be used to determine locational data. In some implementations, the battery is removable.

The user may use the touch sensor arrays 208 and 210 to input commands into the headphone apparatus. For example, each of the individual buttons may be programmed to correspond to specific functions, such as play, stop, rewind, fast forward, pause, repeat, skip, volume increase, or volume decrease. Additional commands may include a command to wirelessly "pair" the headphone to another wireless device, a command to create a post on a social networking site, a command to draft an email, or a command to search for additional information regarding the media content currently being played. The touch sensor array 208 or 210 may be of a PCB, Flex-PCB, or ITO film based design.

Additional commands may be programmed depending on the length of time the button or touch sensor is activated. For example, a brief touch may correspond to a command to fast forward, while a longer touch may correspond to a command to skip forward to the next track. Additional commands may be programmed depending on a sequence of multiple inputs. For example, pressing the touch array 210 twice may correspond to a command to create a post on a social media site, while pressing the touch array 210 three times may correspond to a command to draft an email. In addition, touching the sensor arrays 208 and 210 in a specific order and within a certain timeframe, such to simulate a gesture, can correspond to a command. For example, touching the bottom, middle, and top sensors of touch array 208 in sequence in single sliding motion may correspond to a command to increase the volume. Touching the top, middle, and bottom sensors of touch array 308 in sequence in a single sliding motion may correspond to a command to decrease the volume. Other such "gestures" can be recognized as user commands, including a sliding left to right motion, a sliding right of left motion, a clockwise circular motion, or a counter-clockwise circular motion.

In some embodiments, the headphone 100 may be "paired" with another device through a wireless connection, such that the headphone 100 will only communicate with the paired device. Example wireless connections may include Bluetooth, enabled through an appropriately provided Bluetooth transceiver. Near-field communication (NFC) tags may be used to simplify the "pairing" process. For example, the NFC tag may be pre-programmed from the factory with the unique Bluetooth ID information of the Bluetooth transceiver. A device capable of reading NFC tags can be passed over the NFC tag in order to access the Bluetooth ID information. This information can be used to uniquely identify the Bluetooth transceiver contained within the headphone assembly and to establish the "paired" connection without requiring additional manual entry of the Bluetooth ID by a user. The NFC may also contain other information used to identify the specific model, features, and unique identifying information of the headphones.

Figure 3:
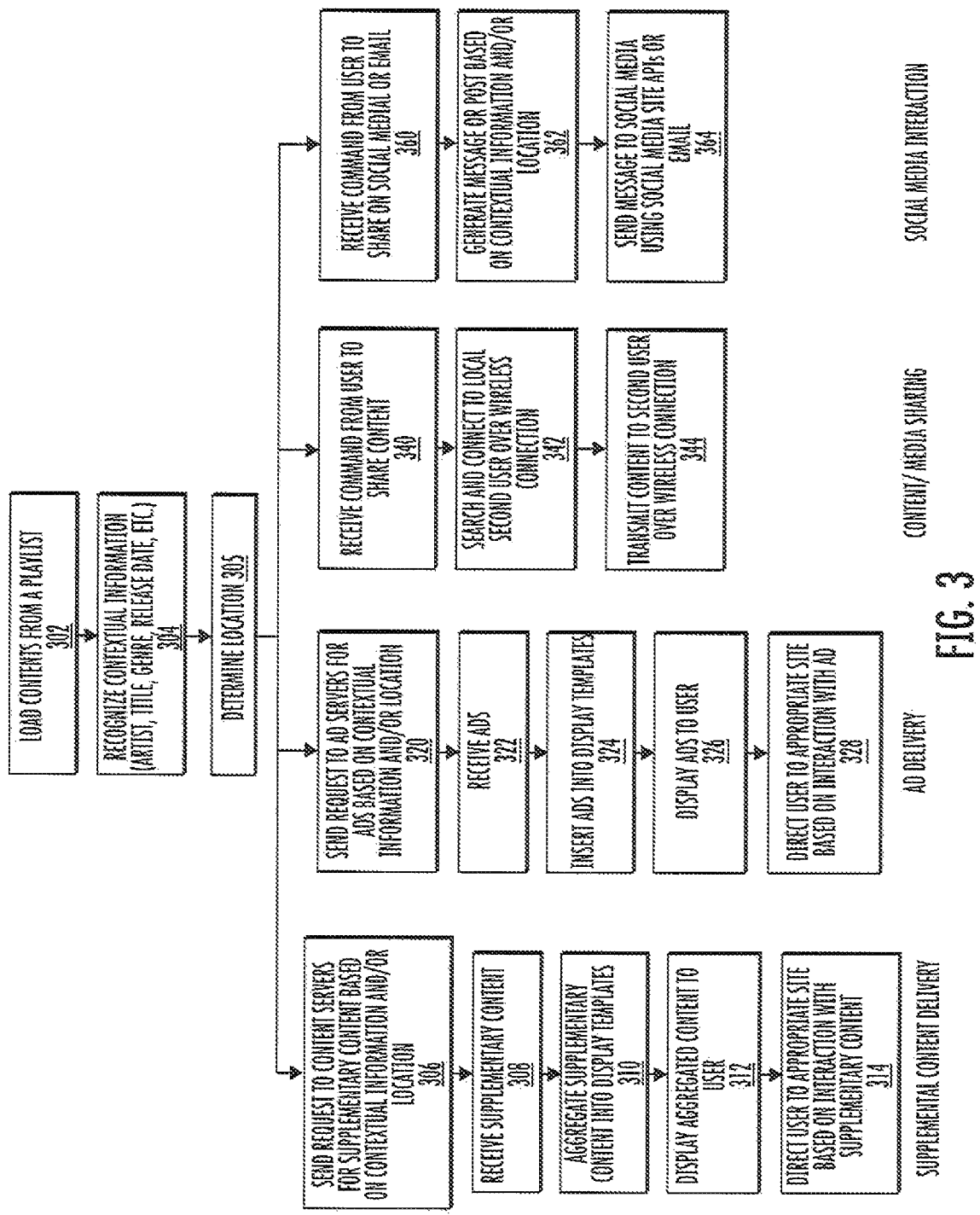
FIG. 3 is an example of a method of an implementation of the present invention.

FIG. 3 illustrates exemplary tasks that may be performed by various embodiments of the present invention. The media player loads a playlist of media content to be played (302), plays the media content, and recognizes contextual information about the media contents of the playlist (304). Examples of contextual information may include the name of the track, the media player may also determine the location (305) of the user using a built in GPS sensor, or using a GPS sensor located on the headphone assembly.

Figure 4:
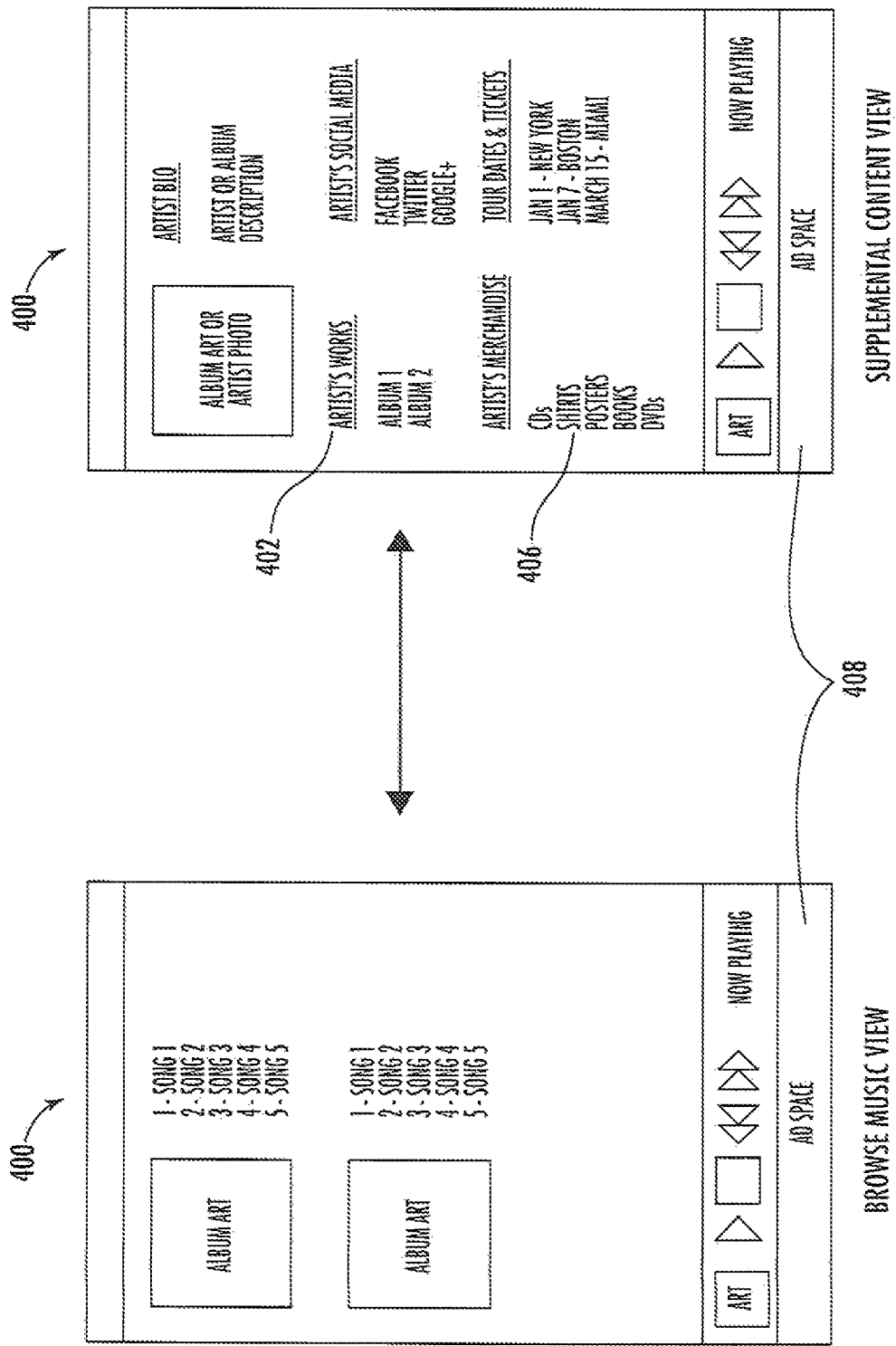
FIG. 4 is an example of an implementation of the present invention.

Using the contextual and location information, the apparatus may deliver supplemental content to the user. The media player sends a request to content servers for supplemental content based on the contextual and location information acquired (306). Supplemental content may include information such as biographical information about the artist, album art or other visual data about the artist, social media messages written by or written about the artist, a list of past and previous tour dates by the artist, "remixed" or alternative tracks, a listing of related merchandise, or a list of "similar" artists and tracks. The media player receives the supplemental content from the content servers (308), aggregates the summary information into display templates (310), and displays the aggregated information to the user (312). An example display template 400 with aggregated information 402 is illustrated in FIG. 4. A user may interact with the aggregated data by selecting an item 406 that he wishes to learn more about. The phone will direct the user to an external site where more detailed information is displayed about the selected item, or to an Internet-based marketplace where merchandise related to the selected item is offered for sale (314).

The apparatus may also deliver ad content based on the contextual information and location information collected. The media player sends a request to ad servers for ad content based on the contextual and location information acquired (320). Ad content may include static images, videos, text, audio recordings, or other forms of media. The media player receives the ad content from the ad servers (322), inserts the ads into display templates (324), and displays the ads to the user (326). An example display template with ads 408 is illustrated in FIG. 4. The user may interact with the ads 408 by selecting an ad that he wishes to learn more about. The phone will direct the user to an external site where more detailed information is displayed about the selected ad, or to an Internet-based marketplace where merchandise related to the selected ad is offered for sale (328).

The apparatus may also allow the user to share media or other content with one or more users. The media player receives a command from the user to share content with a local second user (340). The command may be of a voice command or an input from the touch sensor array. The media player searches and connects to the local second user's device over a wireless connection (342). Wireless connection can be established over any of several common wireless networks including Wi-Fi, Bluetooth, or infrared. After establishing a connection, the media player transmits the content to the second user's device over the wireless connection (344).

In some embodiments, the user may instead share media or other content with one or more users over an Internet connection. In these embodiments, the media player may access the Internet and search for a second user or for a content sharing site through the Internet connection. Access to the Internet may be over any of several common wireless networks including Wi-Fi, Bluetooth, infrared, a cellular network, or a satellite network. The media player connects to the second user's device or the content sharing site over the Internet connection, and transmits the content to the second user's device or content sharing site. The media player may also draft and send a message to one or more users, notifying the one or more users of the newly shared content and providing the location from which it can be retrieved.

The apparatus may also allow the user to interact with various social media sites based upon the contextual data and locational data acquired. In these embodiments, the media player receives a command from the user to interact with a social media site (360). The media player generates a message or an action based upon the contextual and location information (362). Examples of messages may include "[User Name] is listening to [Track Name] by [Artist Name] at [Location]", "[User Name] is playing [Album Name] on the way to [Location]," or any similar message identifying contextual and location information in a social media compatible format. Messages and actions may be transmitted to social media sites using established application programming interfaces (APIs) to ensure compatibility (364).

In some embodiments, the message may also be modified by the user to allow for personalization. The message may also include photographs, videos, audio, or any other related content, either generated by the user or retrieved from content servers or ad servers. Examples of actions may include "liking" an artist or track and subscribing to an artist's social media page. Example social media sites may include Facebook, Twitter, Google+, Instagram, Nike+, or any other such site. In some embodiments, the apparatus may also send messages or perform other such actions over other networking sites or services, such as email, instant messaging providers, SMS message providers, VOIP providers, fax providers, content review sites, educational sites, translation services, reference sites, and online user forums.

Figure 5:
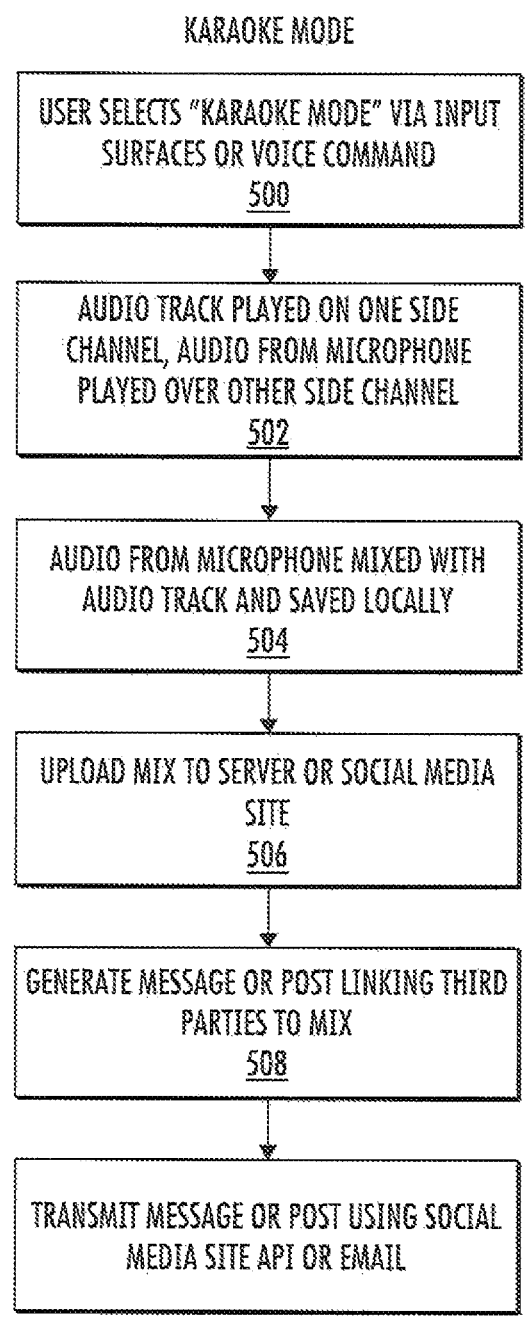
FIG. 5 is an example of an implementation of the present invention.

In some embodiments, the apparatus may operate in "karaoke mode," such that it records the user's voice and mixes it with a background audio sound track. This process is illustrated in FIG. 5. The apparatus enters "karaoke mode" after receiving an appropriate command from the user via voice command or touch sensor input (500). Audio content from a playlist is played on one side audio channel, while audio is recorded from the microphone and played over the other side audio channel (502). Audio from the microphone is mixed with the audio track and saved locally, for example on the flash memory or RAM (504). The mixed audio track may be uploaded to a content sharing site or a social media site via an appropriate Internet connection (506). The mixed audio track may be shared using mechanisms described above, such as through the use of a generated message on a social media site, a generated email message, or message through any other such communications network (508 and 510). The mixed audio track may also be retained on local storage for future playback.

In some embodiments, "karaoke mode" may instead identify the selected audio track using contextual information and access a vocal-free version of the audio track from an appropriate content server. The vocal-free version of the audio track may be used in place of the vocalized version, resulting in a "karaoke" mix that better accentuates the user's own voice without interference from the original vocalizations. The vocal-free version of the audio track may also be mixed with the vocalized version, such that a reduced portion of the original vocalizations remain in the final mix. In some embodiments, accessing the vocal-free versions may also include connecting to an Internet-connected marketplace, such that vocal-free versions may be purchased, downloaded, stored, and used for "karaoke" mode using the apparatus.

In some embodiments, the features of the media player may be limited or enabled based upon the connected headphone. Identifying information from the headphone may be transferred from the headphone to the media player via the wired connector or via a wireless means, such as through as through a Bluetooth network, Wi-Fi network, NFC, or other such communication means. Identifying information is validated against a list of authorized devices, and features of the media player may be disabled or enabled as desired. For example, a user may plug in a headphone as descried above. Information identifying the headphone is transmitted to the media player and is validated against a recognized list of compatible devices, and all features of the media player are enabled as a result. The user may alternatively plug in a headphone that is not recognized by the media player. Certain features, for example "karaoke mode," may be disabled on the media player as a result Additional Embodiments and Implementations Various embodiments of the present invention allow for the control of, interaction with, and creation of content via a remote device, such as an audio headphone, to a base station such as a mobile device, mp3 player, cell phone, mobile phone, smart phone, tablet computer, e-book reader, laptop computer, smart television, smart video screen, networked video players, game networks and the like. For example, example embodiments of the present invention allow for the programming of short-cut commands, such as hand gestures received at or near the headphones, to initiate a command on a software application running on a smart phone, such as posting a "like" on social network relating to a song played on the headphone.

In some implementations, a hand gesture or other user input may be used to initiate a translation function of embodiments of the present invention. The translation function may be used to translate spoken messages into a different language, and transmitted between multiple users. For example, in some embodiments, the translation function enables microphones 244 on headphones 100, and headphones 100 records the speech of the user. This speech is transmitted over connections 108 and 114 to a translation service connected to Internet 110 to produced translated speech. Translation services may include Google Translate, Babble Fish, or any other similar service. Translated speech may then be transmitted to other users using various messaging protocols. In some embodiments, translated speech is transmitted using email messages, SMS messages, VOIP communication, telephone communication, social media message, gaming network, or any other means of communication. Translated speech may be transmitted in the form of text or voice. In some embodiments, translated text converted from text to voice, or vice versa, using text-to-speech techniques or digital transcription techniques.

In some embodiments, headphone 100 is connected to another similar headphone 100, either locally through a local-area network, or over the Internet using a wide-area network. Example networks include WiFi, Bluetooth, NFC, hard-wire connection, or other such networks. In these embodiments, translated text may be transmitted from headphone 100 to one user to headphone 100 of another user. In some embodiments, translated text of a first user may be transmitted in real time or near-real time to a second user, such that the second user receives translated text at the same time or nearly at the same time that the first user speaks. The translated text may be sent in text-based form, or may be converted into speech by text-to-speech techniques, and played back on the second user's headphone 100.

In some embodiments, headphones 100 may be used in conjunction with language learning software. Language learning software includes products such as Rosetta Stone®. Headphones 100 may record the speech of a user, and then evaluate the accuracy of the speech with regard to factors such as pitch, tone, and inflection. Accuracy may be determined by headphones 100, or by the language learning software. In this manner, a user may use headphone 100 to evaluate his spoken command of a foreign language, and then refine his speech based on feedback from headphone 100.

Previous attempts to control content or content players via remote devices such as headphones and remote controls have allowed user manipulation of the audio visual content as experienced by the user (e.g., adjusting volume, pausing, rewinding, etc.). Implementations of the present invention allow for the user to create additional content from the remote device for distribution over a network, such as comments relating to content, accessing promotional offers, product registration, participation in live promotions, etc. Such layered content creation has previously been done through user input at the base device, such as typing into a smart phone to indicate a favorable response or opinion for a song. With various implementations of the present invention, a user can program the base device, such as a smart phone, to recognize simple inputs made at the remote device and associate those inputs with a specific command to be executed in programs or applications running on the device or accessible by the device.

By way of example, and without limitation, a user can download a program onto a smartphone that recognizes input made via an input pad on a headphone. The input, such as a circle made by the finger on the input pad (or touch sensor array) can be associated with a command on an mp3 player application. The circle motion can be associated with a command to pull all songs of a related genre from a sponsor's play list.

Figure 6:
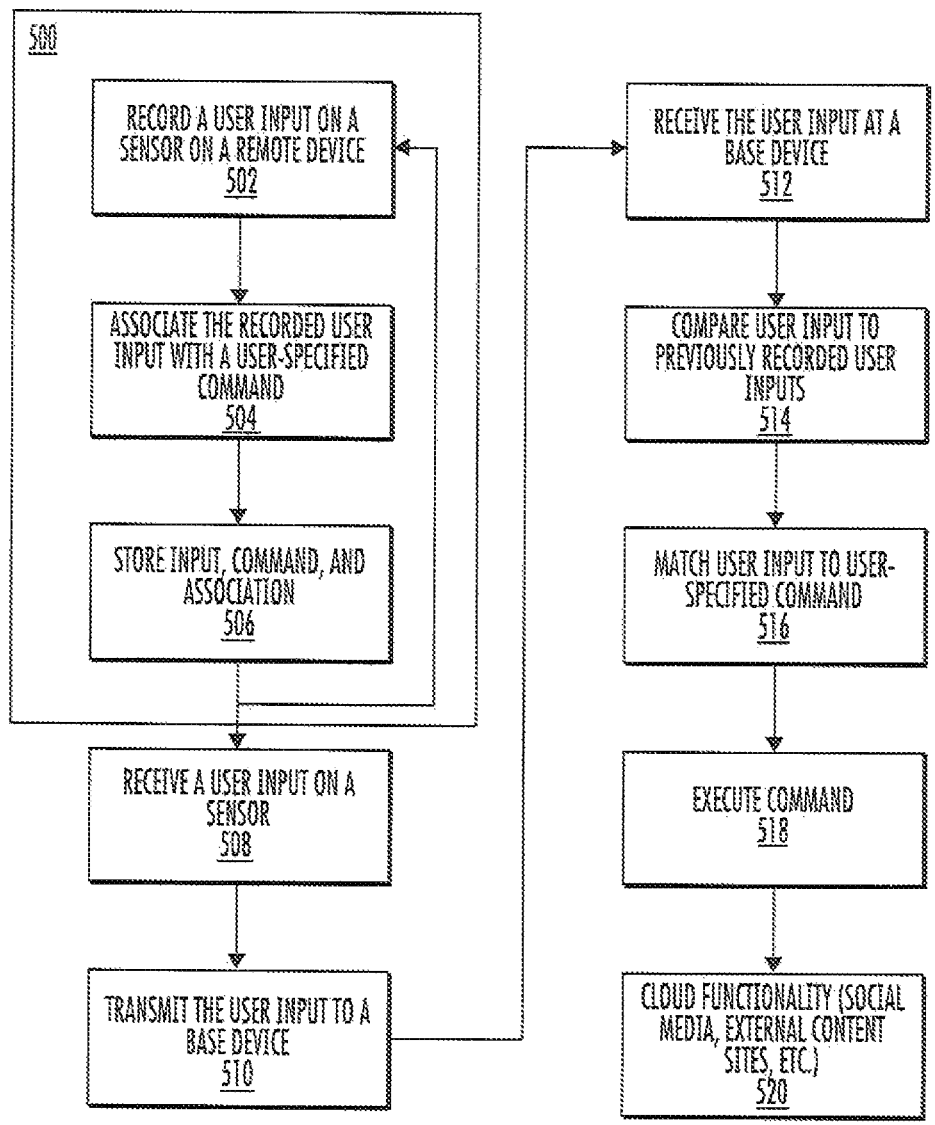
FIG. 6 is an example of a method of an implementation of the present invention.

In a broad implementation of the present invention, and with reference to FIG. 6, a method of remote access to a hosted application comprises the steps of creating associated command (500) (e.g., abbreviated inputs at a remote device associated with the execution of a function or step in a hosted application) and receiving a remote command for execution. More specifically, a method of remote access to a hosted application comprises the steps of: recording a user input from a sensor on a remote device (502); associating the recorded user input with a specific command (504); storing the command-input association (506); receiving a user input on a sensor on a remote device (508); transmitting the user input from the remote device to a base device (510); receiving at the base device the user input transmitted from the remote device (512); comparing the input with the previously recorded inputs for association with a command specific to an application running on or accessible by the base device (514); matching the user input to the desired command (516) and executing the command (518). In some embodiments the execution of the command (518) may initiate certain cloud functionality (520) to allow user interaction with content available over a network, such as the Internet, a web page, a blogosphere, a blog spot, a social networked, a shared media network, a closed or private network, and the like.

Various implementations of the invention utilize human vital and biological data collected via the external device, such as interactive headphones, to choose music according to mood and/or activity level. For example, when a user is working out in the gym more up-beat music is played while running and more relaxing music is played as the user begins to walk, cool-off and wind down an activity session. This includes a relational database of music, artist and songs with mood classification (pumped-up, calm/relax, etc.) The association of content with activity can be made with simple commands entered via the touch pad on the interactive headphones, or the device can include an accelerometer to detect activity levels. The application running on the base device can include GPS or other location determining software as well as logic to correlate location with calendar entries or other data to determine or confirm activity.

In other examples, the software application of some embodiments of the device can recognize when headphones are removed via indication from the headphones. In a particular commercial embodiment, a music aggregator, such as Pandora® would be able to determine when music is played and when it is paused based on whether the interactive headphones are over the ears or not, thereby avoiding unnecessary licensing fees for the music.

In another example, a user can interact with content, such as just-in-time promotions, targeted marketing, geo-based marketing, and the like, by associating simple commands with registration of the user for participation in a promotional offer, opt-in or opt-out of promotional offers or materials, voting, association, and the like.

Figure 9:
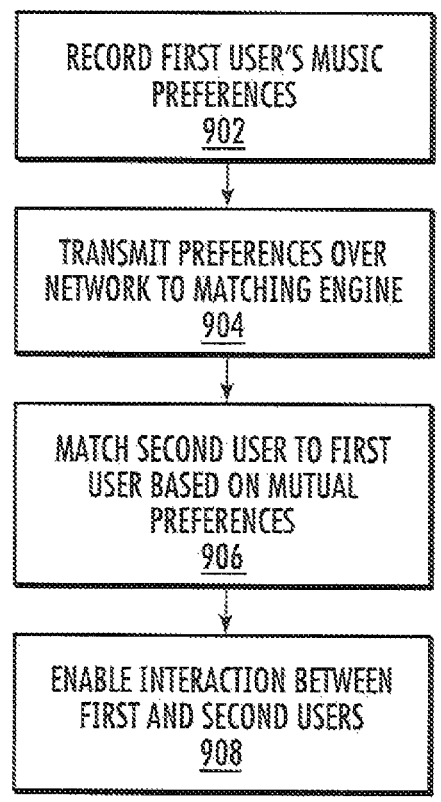
FIG. 9 is an example of an implementation of the present invention.

In some embodiments, headphones 100 may be used to facilitate communication between users based on their musical preferences or other preferences. As illustrated in FIG. 9, headphone 100 collects and records a first user's musical preferences (902). These preferences may be entered manually by the user, or may be automatically determined based on the user's stored media content or a history of the user's media playback. Headphone 100 transmits these preferences to a matching engine (904). The matching engine may be connected to the Internet 110, or may be located on the same local area network as headphone 100 or media player 102.

The matching engine receives these preferences, then finds a match between two users (906). A match may be determined by a variety of factors, such as music preference, age, gender, location, or any other such factors. The matching engine may also use additional information entered by the user, such as favorite movies, sports teams, interests, or other such information.

Information regarding a match is transmitted back to headphone 100 of each matched user, and interaction is enabled between each matched user (908). Communication may be through any communication method, such as telephone, SMS, social media message, VOIP, chat service, or any other such communication methods. In some embodiments, communication is anonymized, such that neither user knows the identity or location of the other user. In some embodiments, users may be assigned unique pseudonyms or user names. In other embodiments, users are not allowed to communicate until both users approve of the communication. Approval may be obtained by a gesture or other input on headphone 100 or on device 102. In some embodiments, users may ban another user from communicating with him or her in order to block future communication from that user. In some embodiments, media content or other digital content may be shared between users after they are matched. In another example implementation, a user motion controlled headphone apparatus and system (hereinafter "Motion-HP") may be used to transformed captured movement data.

In further implementations, the Motion-HP may facilitate social sharing between Motion-HP users. For example, a user may make a command so that the Motion-HP may automatically post the currently played song to social media, e.g., Tweeting "John Smith is listening to #Scientist #Coldplay," a Facebook message "John Smith likes Scientist, Coldplay," and/or the like.

In further implementations, a user may make a gesture to share audio content to another Motion-HP user. For example, the user may scratch an "S" shape on a touch pad of the Motion-HP at the headphone which may indicate "sharing" with another Motion-HP user in a detectable range (e.g., Bluetooth, etc.). In another implementation, the Motion-HP headphones may communicate via Near Field Communication (NFC) handshake. The second Motion-HP may receive the sharing message and adjust the audio source to an Internet radio the first Motion-HP user is listening to, so that the two users may be able to listen to the same audio content. In one implementation, the sharing may be conducted among two or more Motion-HP users. In another implementation, the Motion-HP may share the radio frequency from one user to another, so that they can be tuned to the same radio channel.

In further implementations, the Motion-HP may allow a user to configure user preferred "shortcut keys" for a command. For example, in one implementation, the Motion-HP may be connected to a second device (e.g., other than a headphone), such as a computer, a smart phone, and/or the like, which may provide a user interface for a user to set up short-key movements. For example, the user may select one finger double-tab as sharing the currently played song to a social media platform (e.g., Twitter, Facebook, etc.) as a "like" event, two finger double-tab as sharing the currently played song to social media by posting a link of the song, and/or the like.

In further implementations, the Motion-HP may comprise a headphone with aesthetic designs. For example, the earpad portion may have a transparent design, a colored exterior spin that may feature sponsor information and/or branding logos. In further implementations, the Motion-HP headphones may comprise a touch pad, a touch screen that may show social sharing information (e.g., Tweets, Facebook messages, etc.). In further implementations, the Motion-HP headphone may comprise a removable headband portion to feature user customized graphics. The user may remove the headband portion from the headphone for cleaning purposes. In further implementations, the Motion-HP headphones may be adaptable to helmets.

In further implementations, the Motion-HP may be engaged in a "DJ display" mode, wherein a digital screen at the headphone may display color visualizations including variating color bars that illustrates the frequency of the audio content being played.

In further implementations, the Motion-HP may provide APIs to allow third party services. For example, the Motion-HP headphone may comprise a microphone so that a user may speak over a phone call. In one implementation, a user may instantiate a Motion-HP mobile component at the audio source (e.g., a computer, a smart phone, etc.). When the audio source detects an incoming audio communication request (e.g., a skype call, a phone call, and/or the like), the Motion-HP may automatically turn down the volume of the media player, and a user may make a gesture to answer to the incoming audio communication request, e.g., by tapping on the touch pad of the headphone as the user may have configured one-tap as the shortcut key, etc.

In further implementations, the Motion-HP may allow a user to sing and record the user's own singing. In one implementation, the Motion-HP may instantiate a "Karaoke" mode so that the Motion-HP may perform remix of background soundtrack of a song that is being played and the recorded user's singing to make a cover version of the song. In one implementation, the user may make a gesture on the touch pad of the headphone to share the "cover" version to social media.

In further implementations, the Motion-HP may provide audio recognition (e.g., a "Shazam" like component, etc.). In one implementation, when a user is listening to a radio channel without digital identification of the audio content, the Motion-HP may identify the audio content via an audio recognition procedure.

In further implementations, the Motion-HP may broadcast audio content it receives from an audio source to other Motion-HP headphones via Bluetooth, NFC, etc. For example, a user may connect his/her Motion-HP headphone to a computer to listen to media content, and broadcasting the content to other Motion-HP headphones so that other users may hear the same media content via broadcasting without directly connecting to an audio source.

In further implementations, the Motion-HP may comprise accelerometers to sense the body movement of the user to facilitate game control in a game play environment. In one implementation, the Motion-HP headphone may be engaged as a remote game control via Bluetooth, NFC, Wifi, and/or the like, and a user may move his head to create motions which indicate game control commands.

In further implementations, the Motion-HP may automatically send real-time audio listening status of a user to his subscribed followers, e.g., the fan base, etc.

In further implementations, the Motion-HP may be accompanied by a wrist band, which may detect a user's pulse to determine the user's emotional status, so that the Motion-HP may automatically select music for the user. For example, when a heavy pulse is sensed, the Motion-HP may select soft and soothing music to the user.

In further implementations, the Motion-HP headphone may comprise a flash memory to store the user's social media feeds, user's configuration of audio settings, user defined shortcut keys, and/or the like. For example, when the user plugs a Motion-HP headphone to a different audio source, the user does not need to re-configure Motion-HP parameters.

In further implementations, the Motion-HP component may allow a user to add third party music services, such as but not limited to iTunes, Pandora, Rhapsody, and/or the like, to the Motion-HP. In further implementations, the user may configure shortcut keys for selection of music services, control the playlist, and/or the like.

In further implementations, the Motion-HP may provide registration services in order to access full usage of the Motion-HP. For example, a user may access a registration platform via a computer, etc. A user may be allowed to access limited features of the Motion-HP, e.g., play music, etc., but not able to access additional features such as "DJ mode," "Karaoke mode," and/or the like.

Further implementations of the Motion-HP include analytics for targeting advertisements, revenue sharing between advertising channels and sponsors, music selection and recommendation to a user, and/or the like.

Figure 7:
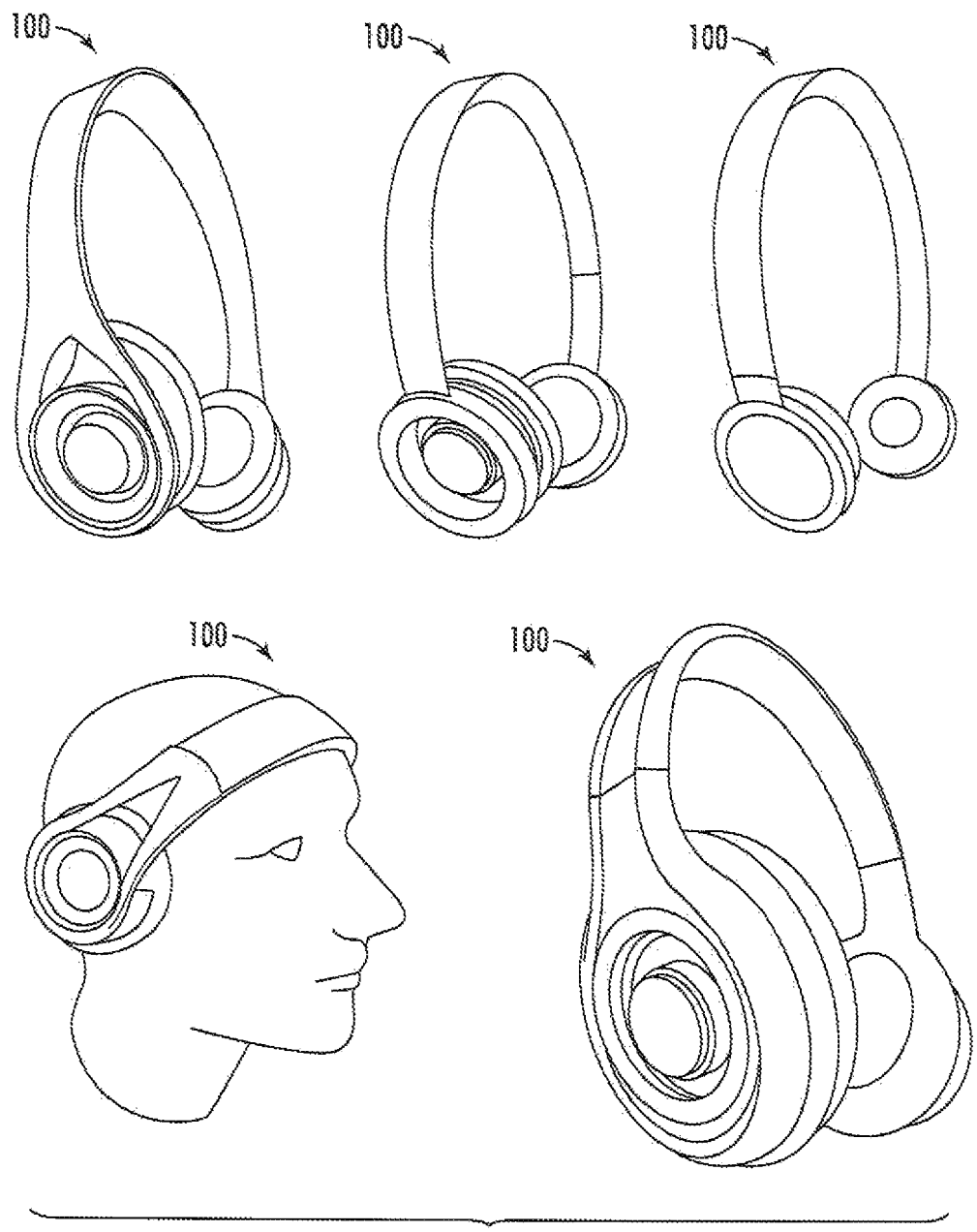
FIG. 7 is an example of an implementation of the present invention.

FIG. 7 provides various examples of the Motion-HP headphones 100 within embodiments of the Motion-HP.

Motion-HP Controller

Figure 8:
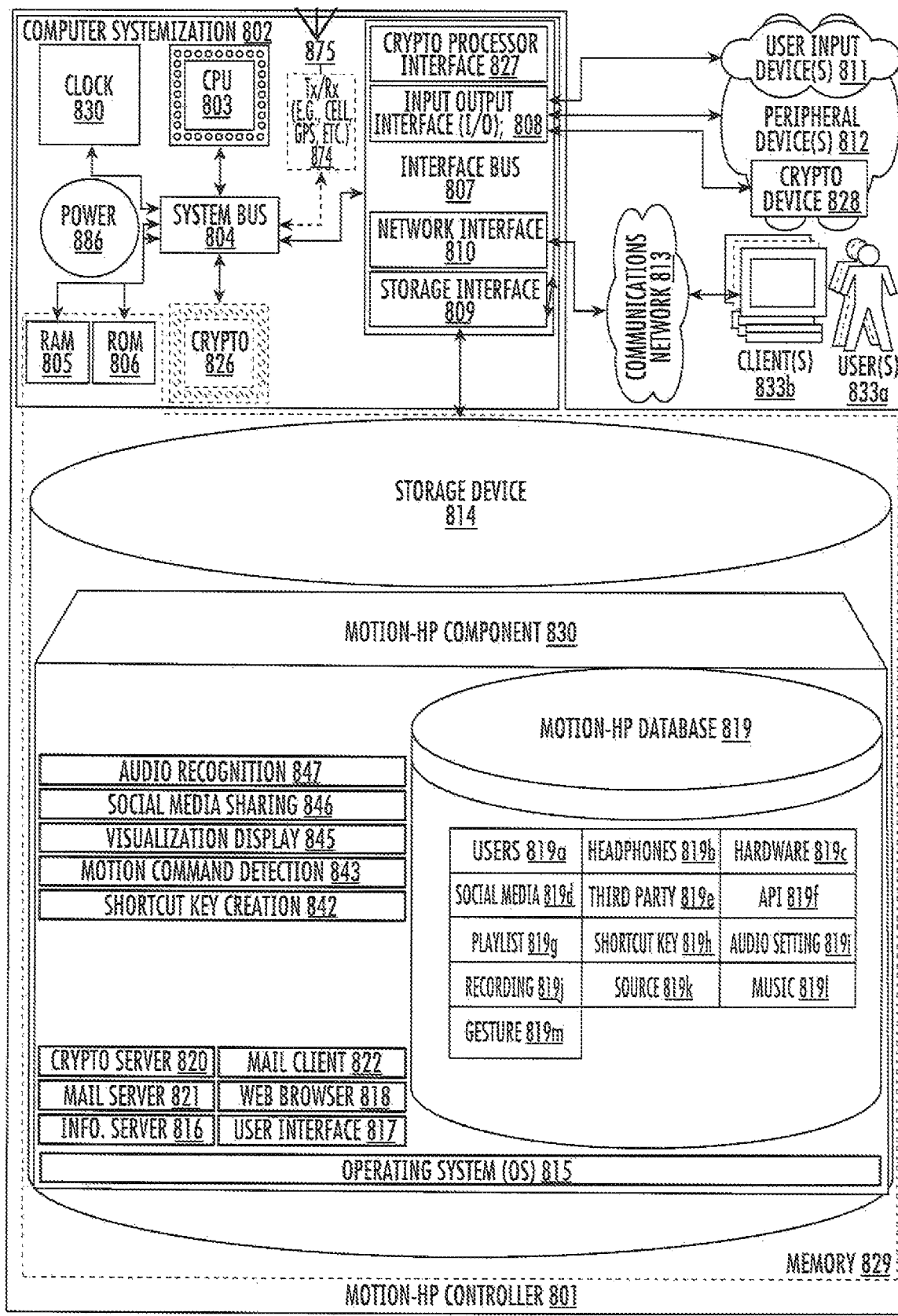
FIG. 8 is a block diagram illustrating examples of the present invention.

FIG. 8 shows a block diagram illustrating examples of a Motion-HP controller 801. In this embodiment, the Motion-HP controller 801 may serve to aggregate, process, store, search, serve, identify, instruct, generate, match, and/or facilitate interactions with a computer through various technologies, and/or other related data.

Users, e.g., 833a, which may be people and/or other systems, may engage information technology systems (e.g., computers) to facilitate information processing. In turn, computers employ processors to process information; such processors 803 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 829 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the Motion-HP controller 801 may be connected to and/or communicate with entities such as, but not limited to: one or more users from user input devices 811; peripheral devices 812; an optional cryptographic processor device 828; and/or a communications network 813. For example, the Motion-HP controller 801 may be connected to and/or communicate with users, e.g., 833a, operating client device(s), e.g., 833b, including, but not limited to, personal computer(s), server(s) and/or various mobile device(s) including, but not limited to, cellular telephone(s), smartphone(s) (e.g., iPhone®, Blackberry®, Android OS-based phones etc.), tablet computer(s) (e.g., Apple iPad™, HP Slate™, Motorola Xoom™, etc.), eBook reader(s) (e.g., Amazon Kindle™, Barnes and Noble's Nook™ eReader, etc.), laptop computer(s), notebook(s), netbook(s), gaming console(s) (e.g., XBOX Live™, Nintendo® DS, Sony PlayStation® Portable, etc.), portable scanner(s), and/or the like.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The Motion-HP controller 801 may be based on computer systems that may comprise, but are not limited to, components such as: a computer systemization 802 connected to memory 829.

Computer Systemization

A computer systemization 802 may comprise a clock 830, central processing unit ("CPU(s)" and/or "processor(s)" (these terms are used interchangeably throughout the disclosure unless noted to the contrary)) 803, a memory 829 (e.g., a read only memory (ROM) 806, a random access memory (RAM) 805, etc.), and/or an interface bus 807, and most frequently, although not necessarily, are all interconnected and/or communicating through a system bus 804 on one or more (mother)board(s) 802 having conductive and/or otherwise transportive circuit pathways through which instructions (e.g., binary encoded signals) may travel to effectuate communications, operations, storage, etc. The computer systemization may be connected to a power source 886; e.g., optionally the power source may be internal. Optionally, a cryptographic processor 826 and/or transceivers (e.g., ICs) 874 may be connected to the system bus. In another embodiment, the cryptographic processor and/or transceivers may be connected as either internal and/or external peripheral devices 812 via the interface bus I/O. In turn, the transceivers may be connected to antenna(s) 875, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing Motion-HP controller to determine its location)); Broadcom BCM4329FKUBG transceiver chip (e.g., providing 802.11n, Bluetooth 2.1+EDR, FM, etc.), BCM28150 (HSPA+) and BCM2076 (Bluetooth 4.0, GPS, etc.); a Broadcom BCM4750IUB8 receiver chip (e.g., GPS); an Infineon Technologies X-Gold 618-PMB9800 (e.g., providing 2G/3G HSDPA/HSUPA communications); Intel's XMM 7160 (LTE & DC-HSPA), Qualcom's CDMA (2000), Mobile Data/Station Modem, Snapdragon; and/or the like. The system clock may have a crystal oscillator and generates a base signal through the computer systemization's circuit pathways. The clock may be coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: floating point units, integer processing units, integrated system (bus) controllers, logic operating units, memory management control units, etc. and even specialized processing sub-units like graphics processing units, digital signal processing units, and/or the like. Additionally, processors may include internal fast access addressable memory, and be capable of mapping and addressing memory 829 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state/value. The CPU may be a microprocessor such as: AMD's Athlon, Duron and/or Opteron; ARM's classic (e.g., ARM7/9/11), embedded (Coretx-M/R), application (Cortex-A), and secure processors; IBM and/or Motorola's DragonBall and PowerPC; IBM's and Sony's Cell processor; Intel's Atom, Celeron (Mobile), Core (2/Duo/i3/i5/i7), Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code). Such instruction passing facilitates communication within the Motion-HP controller and beyond through various interfaces. Should processing requirements dictate a greater amount speed and/or capacity, distributed processors (e.g., Distributed Motion-HP), mainframe, multicore, parallel, and/or super-computer architectures may similarly be employed. Alternatively, should deployment requirements dictate greater portability, smaller mobile devices (e.g., smartphones, Personal Digital Assistants (PDAs), etc.) may be employed.

Depending on the particular implementation, features of the Motion-HP may be achieved by implementing a microcontroller such as CAST's R8051XC2 microcontroller; Intel's MCS 51 (i.e., 8051 microcontroller); and/or the like. Also, to implement certain features of the Motion-HP, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the Motion-HP component collection (distributed or otherwise) and/or features may be implemented via the microprocessor and/or via embedded components; e.g., via ASIC, coprocessor, DSP, FPGA, and/or the like. Alternately, some implementations of the Motion-HP may be implemented with embedded components that are configured and used to achieve a variety of features or signal processing.

Depending on the particular implementation, the embedded components may include software solutions, hardware solutions, and/or some combination of both hardware/software solutions. For example, Motion-HP features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the Motion-HP features. A hierarchy of programmable interconnects allow logic blocks to be interconnected as needed by the Motion-HP system designer/administrator, somewhat like a one-chip programmable breadboard. An FPGA's logic blocks can be programmed to perform the operation of basic logic gates such as AND, and XOR, or more complex combinational operators such as decoders or simple mathematical operations. In most FPGAs, the logic blocks also include memory elements, which may be circuit flip-flops or more complete blocks of memory. In some circumstances, the Motion-HP may be developed on regular FPGAs and then migrated into a fixed version that more resembles ASIC implementations. Alternate or coordinating implementations may migrate Motion-HP controller features to a final ASIC instead of or in addition to FPGAs. Depending on the implementation all of the aforementioned embedded components and microprocessors may be considered the "CPU" and/or "processor" for the Motion-HP.

Power Source

The power source 886 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 286 is connected to at least one of the interconnected subsequent components of the Motion-HP thereby providing an electric current to all the interconnected components. In one example, the power source 886 is connected to the system bus component 804. In an alternative embodiment, an outside power source 886 is provided through a connection across the I/O 208 interface. For example, a USB and/or IEEE 1394 connection carries both data and power across the connection and is therefore a suitable source of power.

Interface Adapters

Interface bus(ses) 807 may accept, connect, and/or communicate to a number of interface adapters, frequently, although not necessarily in the form of adapter cards, such as but not limited to: input output interfaces (I/O) 808, storage interfaces 809, network interfaces 810, and/or the like. Optionally, cryptographic processor interfaces 827 similarly may be connected to the interface bus. The interface bus provides for the communications of interface adapters with one another as well as with other components of the computer systemization. Interface adapters are adapted for a compatible interface bus. Interface adapters may connect to the interface bus via an expansion and/or slot architecture. Various expansion and/or slot architectures may be employed, such as, but not limited to: Accelerated Graphics Port (AGP), Card Bus, ExpressCard, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), Thunderbolt, and/or the like.

Storage interfaces 209 may accept, communicate, and/or connect to a number of storage devices such as, but not limited to: storage devices 814, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, Ethernet, fiber channel, Small Computer Systems Interface (SCSI), Thunderbolt, Universal Serial Bus (USB), and/or the like.

Network interfaces 810 may accept, communicate, and/or connect to a communications network 813. Through a communications network 813, the Motion-HP controller is accessible through remote clients 833b (e.g., computers with web browsers) by users 833a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed Motion-HP), architectures may similarly be employed to pool, load balance, and/or otherwise increase the communicative bandwidth required by the Motion-HP controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 810 may be used to engage with various communications network types 813. For example, multiple network interfaces may be employed to allow for the communication over broadcast, multicast, and/or unicast networks.

Input Output interfaces (I/O) 808 may accept, communicate, and/or connect to user input devices 811, peripheral devices 812, cryptographic processor devices 828, and/or the like. I/O may employ connection protocols such as, but not limited to: audio: analog, digital, monaural, RCA, stereo, and/or the like; data: Apple Desktop Bus (ADB), Bluetooth, IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, DisplayPort, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One output device may be a video display, which may take the form of a Cathode Ray Tube (CRT), Liquid Crystal Display (LCD), Light Emitting Diode (LED), Organic Light Emitting Diode (OLED), Plasma, and/or the like based monitor with an interface (e.g., VGA, DVI circuitry and cable) that accepts signals from a video interface. The video interface composites information generated by a computer systemization and generates video signals based on the composited information in a video memory frame. Another output device is a television set, which accepts signals from a video interface. Often, the video interface provides the composited video information through a video connection interface that accepts a video display interface (e.g., an RCA composite video connector accepting an RCA composite video cable; a DVI connector accepting a DVI display cable, HDMI, etc.).

User input devices 811 often are a type of peripheral device 812 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 812 may be connected and/or communicate to I/O and/or other facilities of the like such as network interfaces, storage interfaces, directly to the interface bus, system bus, the CPU, and/or the like. Peripheral devices may be external, internal and/or part of the Motion-HP controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 228), force-feedback devices (e.g., vibrating motors), near field communication (NFC) devices, network interfaces, printers, radio frequency identifiers (RFIDs), scanners, storage devices, transceivers (e.g., cellular, GPS, etc.), video devices (e.g., goggles, monitors, etc.), video sources, visors, and/or the like. Peripheral devices often include types of input devices (e.g., microphones, cameras, etc.).

It should be noted that although user input devices and peripheral devices may be employed, the Motion-HP controller may be embodied as an embedded, dedicated, and/or monitor-less (i.e., headless) device, wherein access would be provided over a network interface connection.

Cryptographic units such as, but not limited to, microcontrollers, processors 826, interfaces 827, and/or devices 828 may be attached, and/or communicate with the Motion- HP controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: the Broadcom's CryptoNetX and other Security Processors; nCipher's nShield (e.g., Solo, Connect, etc.), SafeNet's Luna PCI (e.g., 7100) series; Semaphore Communications' 40 MHz Roadrunner 184; sMIP's (e.g., 208956); Sun's Cryptographic Accelerators (e.g., Accelerator 6000 PCIe Board, Accelerator 500 Daughtercard); / (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 829. However, memory is a fungible technology and resource, thus, any number of memory embodiments may be employed in lieu of or in concert with one another. It is to be understood that the Motion-HP controller and/or a computer systemization may employ various forms of memory 829. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In one configuration, memory 829 will include ROM 806, RAM 805, and a storage device 814. A storage device 814 may employ any number of computer storage devices/systems. Storage devices may include a drum; a (fixed and/or removable) magnetic disk drive; a magneto-optical drive; an optical drive (i.e., Blueray, CD ROM/ RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 829 may contain a collection of program and/or database components and/or data such as, but not limited to: operating system component(s) 815 (operating system); information server component(s) 816 (information server); user interface component(s) 817 (user interface); Web browser component(s) 818 (Web browser); database(s) 819; mail server component(s) 821; mail client component(s) 822; cryptographic server component(s) 820 (cryptographic server); the Motion-HP component(s) 835; and/or the like (i.e., collectively a component collection). These components may be stored and accessed from the storage devices and/or from storage devices accessible through an interface bus. Although non-conventional program components such as those in the component collection, may be stored in a local storage device 814, they may also be loaded and/or stored in memory such as: peripheral devices, RAM, remote storage facilities through a communications network, ROM, various forms of memory, and/or the like.

Operating System

The operating system component 815 is an executable program component facilitating the operation of the Motion-HP controller. The operating system may facilitate access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. In addition, emobile operating systems such as Apple's iOS, Google's Android, Hewlett Packard's WebOS, Microsofts Windows Mobile, and/or the like may be employed. Any of these operating systems may be embedded within the hardware of the Motion-HP controller, and/or stored/loaded into memory/ storage. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the Motion-HP controller to communicate with other entities through a communications network 813. Various communication protocols may be used by the Motion-HP controller as a subcarrier transport mechanism for interaction, such as, but not limited to: multicast, TCP/IP, UDP, unicast, and/or the like.

Information Server

An information server component 816 is a stored program component that is executed by a CPU. The information server may be an Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C # and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Apple's iMessage, Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the Motion-HP controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the Motion-HP database 219, operating systems, other program components, user interfaces, Web browsers, and/or the like.

Access to the Motion-HP database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the Motion-HP. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the Motion-HP as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua and iOS's Cocoa Touch, IBM's OS/2, Google's Android Mobile UI, Microsoft's Windows 2000/2003/3.1/95/98/CE/Millenium/Mobile/NT/XP/Vista/7/8 (i.e., Aero, Metro), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery (UI), MooTools, Prototype, script.aculo.us, SWFObject, Yahoo! User Interface, any of which may be used and) provide a baseline and means of accessing and displaying information graphically to users.

A user interface component 817 is a stored program component that is executed by a CPU. The user interface may be a graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 818 is a stored program component that is executed by a CPU. The Web browser may be a hypertext viewing application such as Google's (Mobile) Chrome, Microsoft Internet Explorer, Netscape Navigator, Apple's (Mobile) Safari, embedded web browser objects such as through Apple's Cocoa (Touch) object class, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., Chrome, FireFox, Internet Explorer, Safari Plug-in, and/or the like APIs), and/or the like. Web browsers and like information access tools may be integrated into PDAs, cellular telephones, smartphones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly effect the obtaining and the provision of information to users, user agents, and/or the like from the Motion-HP equipped nodes. The combined application may be nugatory on systems employing standard Web browsers.

Mail Server

A mail server component 821 is a stored program component that is executed by a CPU 203. The mail server may be an Internet mail server such as, but not limited to Apple's Mail Server (3), dovecot, sendmail, Microsoft Exchange, and/or the like. The mail server may allow for the execution of program components through facilities such as ASP, ActiveX, (ANSI) (Objective-) C (++), C # and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the Motion-HP.

Access to the Motion-HP mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 822 is a stored program component that is executed by a CPU 203. The mail client may be a mail viewing application such as Apple (Mobile) Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 820 is a stored program component that is executed by a CPU 803, cryptographic processor 826, cryptographic processor interface 827, cryptographic processor device 828, and/or the like. Cryptographic processor interfaces will allow for expedition of encryption and/or decryption requests by the cryptographic component; however, the cryptographic component, alternatively, may run on a CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the Motion-HP may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the Motion-HP component to engage in secure transactions if so desired. The cryptographic component facilitates the secure accessing of resources on the Motion-HP and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The Motion-HP Database

The Motion-HP database component 819 may be embodied in a database and its stored data. The database is a stored program component, which is executed by the CPU; the stored program component portion configuring the CPU to process the stored data. The database may be any of a number of fault tolerant, relational, scalable, secure database such as DB2, MySQL, Oracle, Sybase, and/or the like. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the Motion-HP database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the Motion-HP database is implemented as a data-structure, the use of the Motion-HP database 219 may be integrated into another component such as the Motion-HP component 235. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 819 includes several tables 819a-1. A Users table 819a may include fields such as, but not limited to: user_id, headphone_id, hward-ware_id, ssn, dob, first_name, last_name, age, state, address_firstline, address_secondline, zipcode, devices_list, contact_info, contact_type, alt_contact_info, alt_contact_type, and/or the like. The Users table may support and/or track multiple entity accounts on a Motion-HP. A Headphone table 819b may include fields such as, but not limited to: headphone_ID, headphone_name, headphone_IP, headphone_MAC, headphone_type, headphone_model, headphone_version, headphone_OS, headphone_apps_list, headphone_securekey, and/or the like. A Hardware table 819c may include fields such as, but not limited to: hd_id, hd_name, hd_type, hd_manufacturer, hd_date, hd_description, hd_ip, hd_MAC, and/or the like. A Social Media table 891d may include fields such as, but not limited to: user_id, social_media_name, user_password, social_media_ip, social_media_server_name, social_media_url, social_media_API, and/or the like. A Third Party table 819e may include fields such as, but not limited to: vendor_id, vendor_name, vendor_app_id, vendor_app_name, vendor_app_type, vendor_app_dependencies, and/or the like. An API table 819f may include fields such as, but not limited to: API_id, API_name, API_sponsor, API_vendor_id, API_xml, API_signature, and/or the like. A Playlist table 891g may include fields such as, but not limited to: playlist_id, playlist_source, playlist_item, playlist_user_id, playlist_social_feeds, playlist_genre, and/or the like. A Shortcut Key table 819h may include fields such as, but not limited to: key_id, key_name, key_content, key_movement, key_indication, key_text_description, key_logic, key_user_id, key_date, and/or the like. An Audio Setting table 819i may include fields such as, but not limited to: setting_id, setting_date, setting_user_id, setting_headphone_id, setting_hd_id, setting_type, setting_parameters, and/or the like. A Recording table 819j may include fields such as, but not limited to: record_id, record_name, record_date, record_background, record_user_id, record_sharing, and/or the like. A Source table 819k may include fields such as, but not limited to: source_id, source_name, source_type, source_hd_id, source_ip, source_MAC, source_app_inventory, source_OS, and/or the like. A Music table 819k may include fields such as, but not limited to: music_id, music_genre, music_artist, music_rating, music_title, music_album, music_producer, music_user_id, and/or the like.

In one embodiment, the Motion-HP database may interact with other database systems. For example, employing a distributed database system, queries and data access by search Motion-HP component may treat the combination of the Motion-HP database, an integrated data security layer database as a single database entity.

In one embodiment, user programs may contain various user interface primitives, which may serve to update the Motion-HP. Also, various accounts may require custom database tables depending upon the environments and the types of clients the Motion-HP may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 819a-o. The Motion-HP may be configured to keep track of various settings, inputs, and parameters via database controllers.

The Motion-HP database may communicate to and/or with other components in a component collection, including itself, and/or facilities of the like. Most frequently, the Motion-HP database communicates with the Motion-HP component, other program components, and/or the like. The database may contain, retain, and provide information regarding other nodes and data.

The Motion-HPs

The Motion-HP component 835 is a stored program component that is executed by a CPU. In one embodiment, the Motion-HP component incorporates any and/or all combinations of the aspects of the Motion-HP discussed in the previous figures. As such, the Motion-HP affects accessing, obtaining and the provision of information, services, transactions, and/or the like across various communications networks.

The Motion-HP component may transform user movements (e.g., tapping, finger swirling, etc.) via Motion-HP components (e.g., Shortcut key creation 842, Motion Command Detection 843, Visualization Display 845, Social Media Sharing 846, Audio Recognition 847, and/or the like) into audio playing status change, social media status publication, and/or the like and use of the Motion-HP.

The Motion-HP component enabling access of information between nodes may be developed by employing standard development tools and languages such as, but not limited to: Apache components, Assembly, ActiveX, binary executables, (ANSI) (Objective-) C (++), C # and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the Motion-HP server employs a cryptographic server to encrypt and decrypt communications. The Motion-HP component may communicate to and/or with other components in a component collection, including itself, and/or facilities of the like. Most frequently, the Motion-HP component communicates with the Motion-HP database, operating systems, other program components, and/or the like. The Motion-HP may contain, communicate, generate, obtain, and/or provide program component, system, user, and/or data communications, requests, and/or responses.

Distributed Motion-HPs

The structure and/or operation of any of the Motion-HP node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the Motion-HP controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c -post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse:

databases, data collections, data stores, structured data, and/or the like. Again, the desired configuration will depend upon the context, environment, and requirements of system deployment.

For example, in some implementations, the Motion-HP controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until
end of message
do {
   $input = "";
   $input = socket_read($client, 1024);
   $data .= $input;
} while($input != "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xay.com/perl/site/lib/SOAP/Parser.html
http://publib.boulder.ibm.com/infocenter/tivihelp/v2r1/
   index.jsp?topic=/com.ibm.IBMDI.doc/
   referenceguide295.htm
and other parser implementations:
http://publib.boulder.ibm.com/infocenter/tivihelp/v2r1/
   index.jsp?topic=/com.ibm.IBMDI.doc/
   referenceguide259.htm
all of which are hereby expressly incorporated by reference herein.

In order to address various issues and advance the art, the entirety of this application shows, by way of illustration, various example embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any data flow sequence(s), program components (a component collection), other components, and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, processors, services, servers, and/or the like that may execute asynchronously, concurrently, in parallel, simultaneously, synchronously, and/or the like also are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations, including the right to claim such innovations, file additional applications, continuations, continuations-in-part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a Motion-HP individual and/or enterprise user, database configuration and/or relational model, data type, data transmission and/or network framework, syntax structure, and/or the like, various embodiments of the Motion-HP may be implemented that allow a great deal of flexibility and customization. For example, aspects of the Motion-HP may be adapted for mobile device social sharing. While various embodiments and discussions of the Motion-HP have been directed to motion control technology, however, it is to be understood that the embodiments described herein may be readily configured and/or customized for a wide variety of other applications and/or implementations.

Embodiments of the invention are not limited to headphones, but can be incorporated into dongles, or other external input devices. The methods of creating layered content and interacting with programs and content hosted on a base device via commands entered into a remote device can be implemented in video devices or headphones/video combinations.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An audio system comprising:
an apparatus comprising two wireless earbud audio output components, respective ones of the wireless earbuds comprise an audio driver and are each configured to insert into ears of a user of the audio system;
a network communication interface configured to communicate between the apparatus and a media player;
an input sensor coupled to the apparatus; and
an input recognition circuit communicatively coupled to the input sensor, wherein the input recognition circuit is configured to:
receive an input via the input sensor, the input associated with a first command to transmit a first message to the media player and wherein the input recognition circuit is further configured to transmit a second message, different than the first message, to the media player responsive to receiving the same input via the input sensor responsive to the apparatus changing the input as being associated with the first command to being associated with a second command;
wherein the first message comprises a message to a server external to the media player and the audio system, and wherein the message that is transmitted to the server comprises information related to audio playing on the audio system when the input is received;
receive a first instance of the input provided by the user to the input sensor;
determine that the input matches a first association between the input and a command to be executed on the media player;
responsive to the input matching the first association, provide the first message to the media player for execution;
receive a second association between the input and a second message to be executed on the media player;
after receiving the second association, receive a second instance of the input provided by the user to the input sensor;
determine that the second instance of the input matches the second association between the input and the second message to the media player; and responsive to the second instance of the input matching the second association, provide the second message to the media player.

2. The audio system of claim 1 wherein the media player is separate from the audio system.

3. The audio system of claim 1 wherein the message comprises a command to share content associate with content played by the media player to a social media server.

4. The audio system of claim 1, wherein the input recognition circuit is part of the media player, and wherein the apparatus is configured to transmit the input to the input recognition circuit via the network communication interface.

5. The audio system of claim 1, wherein the input recognition circuit comprises an Application Programming Interface (API) executing on the media player.

6. The audio system of claim 1, wherein the input recognition circuit is part of the apparatus, and wherein the apparatus is configured to transmit the first and second commands to the media player via the network communication interface.

7. The audio system of claim 1, wherein the audio system further comprises:
at least one camera.

8. The audio system of claim 7, wherein the at least one camera comprises at least one video camera and is operationally coupled to the input sensor.

9. The audio system of claim 1 wherein the media player is configured to receive advertising content in response to the message.

10. The audio system of claim 9 wherein the media player is configured to display the advertising content.

* * * * *